April 21, 1970
E. D. LONG
3,507,263
FLUID COMPRESSION AND EXPANSION WAVE CONVERTER
FOR PRECISION FUEL METERING SYSTEM
Filed June 13, 1969
3 Sheets-Sheet 1
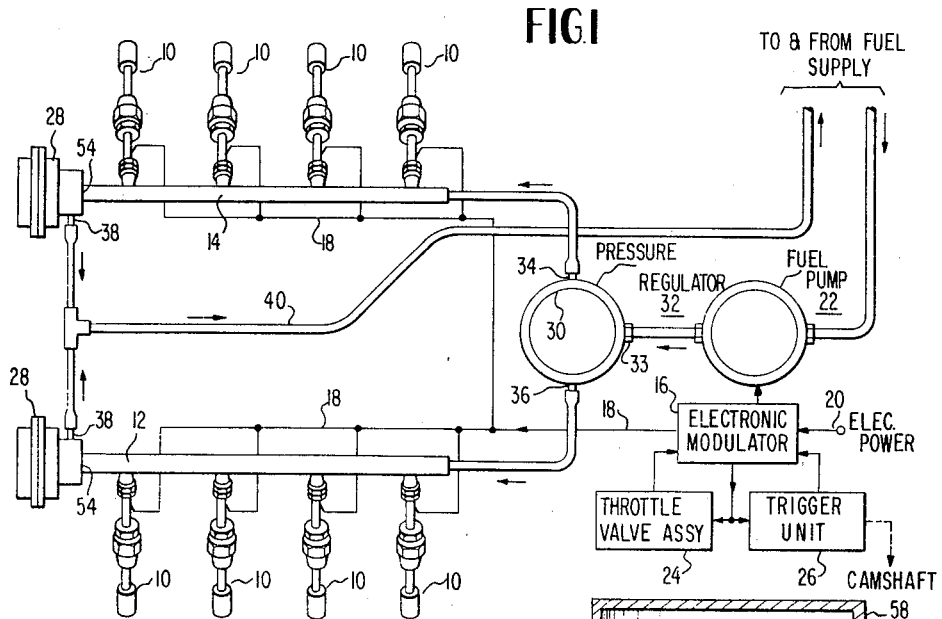
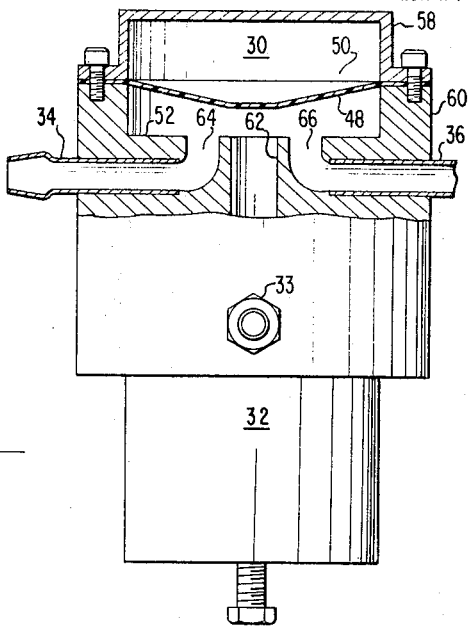
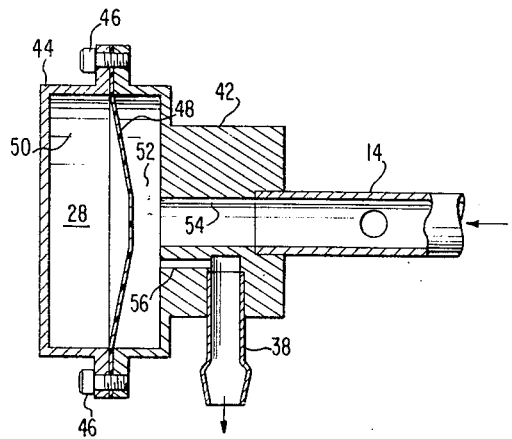
INVENTOR
E. DAVID LONG
by Brady, O'Boyle & Gates
ATTORNEYS

INVENTOR
E. DAVID LONG

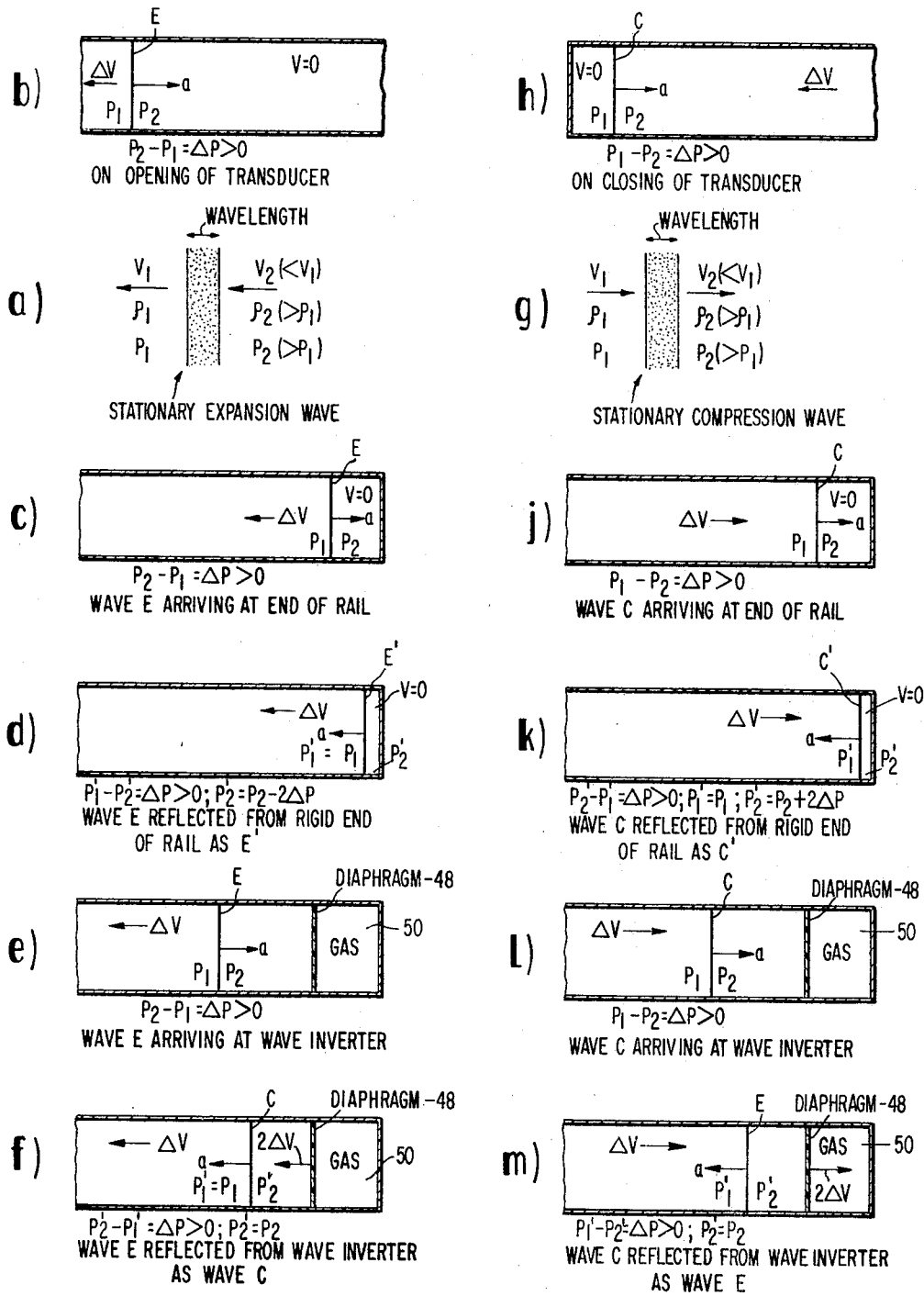

United States Patent Office

3,507,263
Patented Apr. 21, 1970

3,507,263
FLUID COMPRESSION AND EXPANSION WAVE CONVERTER FOR PRECISION FUEL METERING SYSTEM
Emile David Long, 508 College Ave.,
Elmira, N.Y. 14903
Continuation-in-part of application Ser. No. 645,701, June 13, 1967. This application June 13, 1969, Ser. No. 832,962
Int. Cl. F02m 39/00; F02b 3/00, 33/00
U.S. Cl. 123—139      12 Claims

ABSTRACT OF THE DISCLOSURE

A fluid wave inverter for converting compression waves into expansion waves and expansion waves into compression waves propagated in the fuel distribution means of a discontinuous fuel delivery system to a plurality of fuel transducers in a precision fuel metering system wherein the extremely fast actuation time of valves incorporated in the fuel transducers give rise to travelling waves of a wavelength which is relatively short in comparison to the total length of the fuel distribution means. At least one wave inverter means is utilized which is coupled to that end of the fuel distribution means which is opposite from the source end including the fuel pump and a pressure regulator, so that a compression wave is reflected from the wave inverter as an expansion wave and vice versa whereby the pressure is restored to its original value, thereby eliminating all modes of standing waves in the fuel distribution means with the resulting effect that fuel starvation of any of the fuel transducers is eliminated.

CROSS-REFERENCE TO RELATED APPLICATION

The present application is a continuation-in-part of U.S. patent application Ser. No. 645,701, entitled, "Accumulator Means for Precision Fuel Metering Systems," filed on June 13, 1967, in the name of E. David Long. The present invention is also related to U.S. Patent No. 3,412,718, entitled, "Precision Fuel Metering System," issuing on Nov. 26, 1968, in the name of E. David Long, and assigned to the assignee of the present invention.

BACKGROUND OF THE INVENTION

The present invention relates generally to fuel metering systems for internal combustion engines and more particularly to a precision fuel metering system wherein the fuel is supplied to the intake valves of each cylinder in predetermined measured quantities during each cycle in accordance with measured engine operating conditions such as induction passage pressure, atmospheric pressure, engine temperature and atmospheric temperature. In systems where the fuel is supplied to the engine cylinders at a substantially constant pressure, it has been found that equal quantities of fuel are not always discharged when all of the cylinders are simultaneously fed a fuel charge.

It has heretofore been believed that this limitation was due partly to changes in the induction passage pressure which occurred during the operation of the engine. Such a change causes a change in the pressure differential across the orifice of the discharge device which may be, for example, a fuel injector valve. This condition has been compensated for in the past according to the teachings of U.S. Patent 2,948,273 issued to W. C. Suttle. The Suttle patent contemplates the use of a fuel pressure compensator in the fuel line including means for being coupled to the induction passage downstream of the frontal valve for maintaining a predetermined pressure differential across the discharge orifice of a fuel injection nozzle. This configuration admittedly provides equal quantities of fuel discharged into the induction passage for equal time durations of an induction nozzle opening. Also an accumulator or buffer vessel for maintaining constant pressure at the source end of a fuel injection system is well known, being taught by U.S. Patent 3,334,679, Bruning et al.

Notwithstanding the foregoing discussion, it has been discovered that where a plurality of extremely fast acting fuel injector valves and more particularly in the case of a discontinuous system such as the "Precision Fuel Metering System" taught by E. David Long in U.S. Patent 3,412,718, wherein fuel metering transducers having opening and closing times in the order of 100 microseconds are fed under constant pressure from a common fuel line of a relatively small diameter (0.375 in.) and relatively long length (18 ft.), standing waves are built up in the fuel line. This is due to travelling waves of the expansion and compression type generated by the opening and closing, respectively, of the fuel transducers. Once generated, these waves are reflected back and forth in the fuel line between the end terminations of the line and may excite any standing wave mode in the system. The result of such standing waves causes fuel deficiencies to exist at certain times and at certain locations along the fuel line. It can be seen then that where fuel transducers are located along the fuel line, all transducers may not be capable of supplying equal amounts of fuel to their respective cylinders.

SUMMARY OF THE INVENTION

Briefly, the subject invention comprises means for eliminating the fluid standing wave phenomenon in a relatively long, small diameter fuel line coupled at one end to a fuel source, a fuel pump, and a pressure regulator means for feeding a plurality of extremely fast-acting fuel transducers selectively coupled along its length and having at least one compression and expansion wave inverter which is coupled to the opposite end of the fuel line. The position of coupling is not more than a predetermined distance away from the opposite end of the fuel line, said predetermined distance being a multiple or submultiple of the wavelength of a compression or expansion wave generated when said plurality of fuel transducers are closed and opened, respectively. The wave inverter is comprised of a housing enclosing a relatively large volume of gas such as air encapsulated by a light, flexible diaphragm of a relatively small inertia, thereby defining a first chamber for the volume of gas and a second chamber for receiving fuel from said fuel line. The volume of the gas is sufficiently large compared to the total incremental volume of fuel delivered by the transducers per engine cycle and the inertia of the diaphragm is chosen to be sufficiently small so that the boundary condition at the end of the fuel line changes essentially to that of an elastic medium having a constant pressure and an arbitrary fluid velocity. This causes compression waves to be reflected from the volume of gas as expansion waves and expansion waves to be reflected as compression waves obviating the inherent doubling of the effect caused by a reflection of the waves without conversion. The reflected waves thus inverted leave behind them a moving fluid, the motion of which is cancelled by subsequent waves travelling in the opposite direction so that cancellation of waves occur, thereby preventing any build up of standing waves in the fuel line.

DESCRIPTION OF DRAWINGS

FIGURE 1 is an illustration of a double fuel rail configuration for an 8-cylinder internal combustion engine having a precision fuel metering system including the subject invention;

FIGURE 2 is a central longitudinal cross sectional view of a first embodiment of a fluid wave inverter shown in FIGURE 1 coupled to one end of a fuel rail;

FIGURE 3 is a partial central longitudinal cross sectional view of a second embodiment of a wave inverter incorporated into a fuel pressure regulator shown in FIGURE 1 coupled to the opposite or fuel supply end of the fuel rail;

FIGURES 7(a)-(m) are a series of illustrative diagrams disclosing the character of the compression and expansion waves generated in a system shown in FIGURES 1 and 4 which are helpful in understanding the subject invention.

DESCRIPTION OF THE PREFERRED EMBODIMENTS

Figure 4:
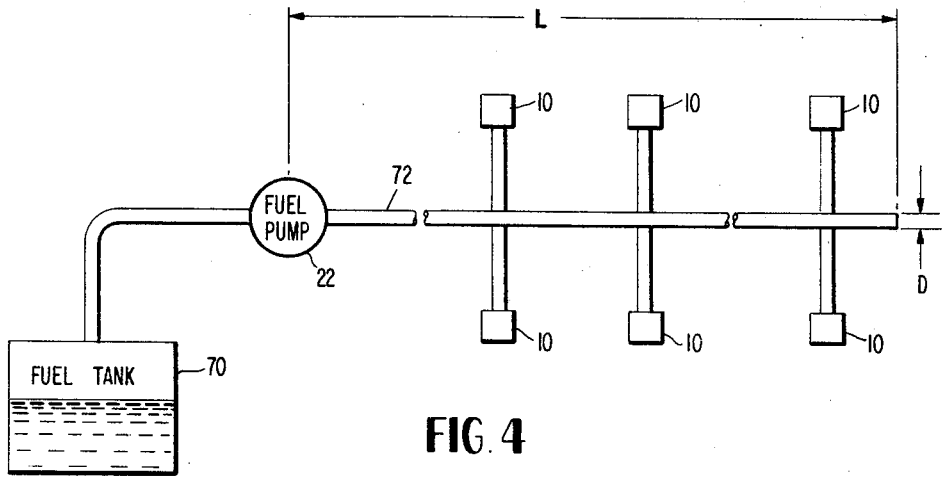
FIGURE 4 is a diagrammatic illustration of a fuel metering system contemplated by the subject invention depicting the length and diameter of a fuel line including the fuel rail shown in FIGURE 1.

Referring now to the drawings wherein like numbers refer to like parts, FIGURE 1 discloses eight fuel metering transducers 10 of the type described in the above referenced U.S. Patent No. 3,412,718. Four of the transducers 10 are mechanically coupled to a first fuel rail 12 while the other four transducers 10 are mechanically coupled to a second fuel rail 14. Both groups of transducers are substantially equally spaced from each other along the respective fuel rails intermediate the ends thereof; however, it should be observed that the spacing is determined primarily by the location of the respective cylinders which they feed. Each of the eight fuel metering transducers 10 is adapted to be simultaneously energized from an electronic modulator circuit 16 by means of the electrical wiring designated by reference numeral 18. The electronic modulator 16 is operable to produce an energizing pulse of variable pulsewidth in accordance with measured engine operating conditions, such as manifold vacuum pressure, engine temperature, atmospheric pressure, etc. Electrical power from the automobile electrical system is coupled into the electronic modulator 16 by means of an input terminal 20. The modulator 16, in addition to generating a variable pulsewidth energizing pulse, distributes electrical power first to an electrically operated fuel pump 22 when the ignition switch, not shown, is closed prior to starting up the engine. Electrical power is also coupled from the electronic modulator 16 to a throttle valve assembly 24 in a trigger unit 26. The throttle valve assembly is coupled to an electronic modulator circuit for partially controlling the pulse width of the enrgizing pulse generated by the moduator. The trigger unit 26 is mechanically coupled to the engine cam shaft by means of a cam follower, not shown, for coupling a trigger pulse into the electronic modulator for providing a timing trigger so that an energizing pulse for the fuel transducers 10 are produced at a predetermined time during each revolution of the engine. When desirable, the trigger unit may be electrically coupled to the modulator through the ignition system.

In the preferred embodiment of the subject invention, a first fluid wave inverter 28 is coupled to one terminal end of each of the fuel rails 12 and 14. This terminal end is at the opposite end from the fuel supply including the fuel tank, not shown, and the fuel pump 22. The physical construction of the fluid wave inverter 28 is shown in FIGURE 2 and will be described in detail subsequently. A second fluid wave inverter is located at the other terminal end of the fuel rails 12 and 14, that terminal end being on the fuel pump side of the fuel rails. The second wave inverter 30 is illustrated in detail in FIGURE 3. In the system configuration shown in FIGURE 1, the fluid wave inverter 30 is adapted to be combined with a pressure regulator 32 which is coupled to the output of the fuel pump 22. It should be noted that this configuration is shown by way of example only and is not meant to be interpreted in a limiting sense. While the preferred embodiment of the subject invention contemplates the use of a fluid wave inverter 28 and 30 at each end of a fuel rail feeding a plurality of transducers 10, the invention in its more basic form may be comprised of a single fluid wave inverter 28 coupled to the terminal end away from the fuel pump 22 shown in FIGURE 1 with the wave inverter 30 being eliminated and a means for maintaining constant pressure, for example, a pressure regulator and/or a conventional accumulator coupled to the fuel pump 22 substituted therefor.

In the embodiment shown in FIGURE 1, two fuel rails 12 and 14 are utilized and the fluid wave inverter 30 comprises one input fitting 33 and two output fittings 34 and 36. Output fitting 34 is coupled to one end of the fuel rail 14 while he other output fitting 36 is coupled to the corresponding end of the fuel rail 12. With respect to the fluid wave inverters 28, however, the input passage 54 is coupled to the respective fuel rails 12 and 14, while a single output fitting 38 is coupled to a return fuel line 40.

Referring now to FIGURE 2, a central longitudinal cross sectional view of the fluid wave inverter 28 is disclosed. The wave inverter is comprised of a first and a second hollow body portion 42 and 44 fastened together by means of screws 46. A thin concavo-convex flexible diaphragm 48 is held between the flanges of the body portions 42 and 44 by means of the screws 46. The diaphragm 48 is comprised of material having a respectively small mass so that small inertia to movement is provided. Secondly, the diaphragm is selected of a material that is inert in the presence of engine fuel, such as gasoline. One example of a suitable material is a synthetic resin such as polyethylene terephthalate, commonly referred to as "Mylar." The flexible diaphragm 48 in combination with the body portion 42 and 44 define a first and a second chamber 50 and 52, respectively. Furthermore, the flexible diaphragm is preformed into the concavo-convex configuration with the convex portion forming one side of the chamber 52 while the concave portion forms one side of the chamber 50. The chamber 50 is of a predetermined volume and is filled with a compressible gas medium such as air being sealed and encapsulated from the chamber 52 by means of the diaphragm 48. The volume of the gas must be relatively large compared with the volume rate of flow multiplied by the typical time period between energizing pulses of the transducers. Fuel flowing in the fuel rail 14 feeds directly into the chamber 52 through the input passage 54. The convex surface of the diaphragm 48 is disposed across the passage 54 substantially transverse to the direction of fuel flow in the fuel rail 14. Fuel in the chamber 52 is adapted to exit through an output port 56 which comprises a relatively small passage communicating with the fitting 38.

The second fluid wave inverter 30 which is placed at the other end of the fuel rails 12 and 14 in the preferred embodiment shown in FIGURE 1 is similar to the wave inverter 28 in that a substantially identical concavo-convex flexible diaphragm 48 is held between the body members 58 and 60 to define a compressible volume of gas or air in the chamber 50 and a fuel chamber 52. The body member 58 is similar to the body portion 44 shown in FIGURE 2. The body member 60, however, differs from the body portion 42 in that it is shown incorporated with the pressure regulator 32 which may be of any conventional design. Furthermore, an intake port 62 is coupled to the fitting 33 while two exit ports are coupled to the fittings 34 and 36. The ports 64 and 66 have an area of sufficient size to provide unrestricted flow of fuel from the input 62 to fuel rails 12 and 14. Furthermore, the outputs 64 and 66 face the convex surface of the diaphragm 48 so that it is directly in line with the path of the fuel flow.

In order to more fully understand the intensive concept of the subject invention, reference is now made to FIGURE 4 which schematically discloses in simplified form a fuel metering system including a fuel tank 70, a fuel pump 22 connected thereto, and a fuel line 72 having a length L and a diameter D connected thereto. A plurality of fuel metering transducers 10 are coupled thereto.

In a conventional internal combustion engine having, for example, 428 cubic inch displacement, approximately 30 gallons per hour at wide open throttle or top speed are required. In a continuous flow system, the 30 gallons per hour are delivered by means of the fuel pump or some such other device being modulated to provide a sudden incremental pressure increase to deliver fuel to the respective cylinders; in a discontinuous system, however, as contemplated by the subject invention, the fuel metering transducers 10 include extremely fast acting valves which are periodically opened and closed to provide increments of fuel which averaged out yields 30 gallons per hour. If, for sake of illustration, a 50% duty cycle is presumed, the system must be operating as though 60 gallons per hour is being delivered. Assuming that the diameter D of the fuel line 72 is 0.375 inch and that the length of the fuel line 72 back to the fuel pump 22 may be as much as 18 feet depending upon the design of the vehicle, it can be seen that the kinetic energy of the fuel flowing in the fuel line 72 is very high since kinetic energy is equal to:

$$K.E. = \frac{1}{2} mv^2$$

where $m$ is the mass of the fuel and $v$ is the velocity.

Figure 5:
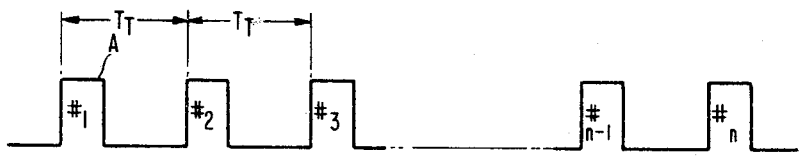
FIGURE 5 is a diagram of waveforms of a plurality of energizing pulses having a period $T_T$ for the plurality of fuel metering transducers shown in FIGURE 1 and FIGURE 4.

At wide open throttle position, the crank shaft speed of the engine may be in the range of 6000 r.p.m. whereupon the fuel metering transducers 10 are energized every once per r.p.m. or every 20 milliseconds as shown by the period $T_T$ of FIGURE 5. An electrical pulse A is provided to each of the transducers simultaneously and has a predetermined pulse width to deliver an increment of fuel which is sufficient to deliver an average of 30 gallons per hour at 6000 r.p.m.

Figure 6:
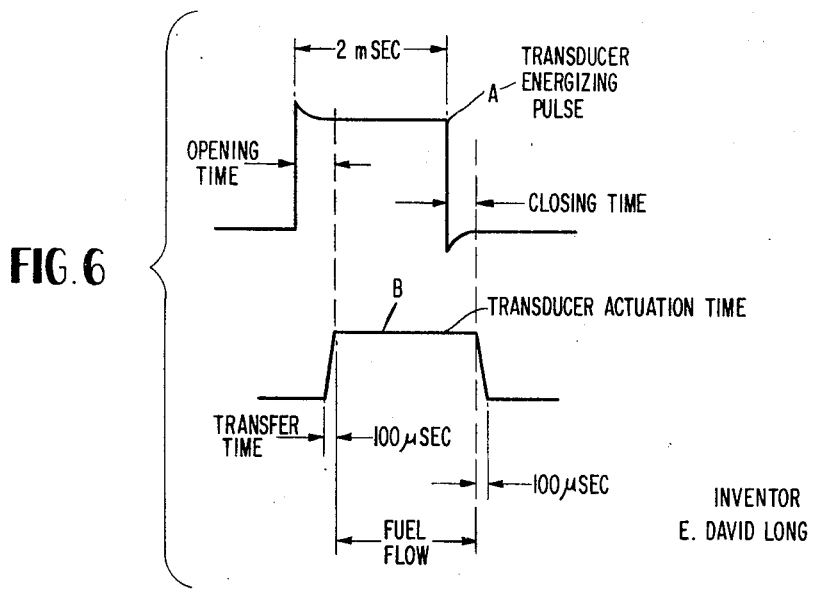
FIGURE 6 is a diagram of waveforms illustrative of the operation of one fuel transducer in response to an energizing pulse applied thereto.

In a system utilizing the fuel metering transducers 10 such as disclosed in U.S. Patent 3,412,718, the operation of these transducers in response to an energizing pulse A is shown in further detail in FIGURE 6. For example, where a pulse A of 2 milliseconds duration is applied, the response of the valve actuation of the transducer can be illustrated as waveform B. As shown, there is a finite opening and closing time delay associated with the transducer upon application of the energizing pulse A including a transfer time of approximately 100 microseconds which is the time required for the transducer valve to move from a fully opened to a fully closed position and vice versa. Since the transfer time ($t$) is in the order of 100 microseconds and the sound velocity ($a$) is approximately 1400 meters per second in gasoline, a travelling wave is generated each time the valve opens or closes. The wavelength of this wave is equal to $t \times a = 14$ cm. $\approx 6$ in. Each time a fuel transducer 10 opens, an expansion wave of approximately 6 inches long is generated whereas a compression wave of 6 inches wavelength is produced when the valve closes. Since the wavelengths (6 in.) are long in relation to the diameter (0.375 in.) of the fuel lines, a gradual pressure rise or fall occurs at the junction of the transducers to the fuel rail. However, this wavelength is short in comparison to the length of the line which causes waves to propagate in the fuel line in both directions along the line. Unless properly compensated for, these waves can build up over a period of time and form standing waves. Since the waves may travel up and down the fuel line many times, any standing wave mode can get excited. Simple changes in geometry, moreover, will not solve the problem. Similarly, side tubes with so-called "accumulators" are not an effective means of control since only part of the wave will travel into the side arm while the rest of the wave continues further into the line. This is quite distinct from the still slower changes in pressure which can be effectively controlled by accumulators.

Next, the phenomenon of compression and expansion waves in liquids is considered. In fuel lines as in any other tubes carrying liquids, there arise waves whenever liquid is suddenly stopped or suddenly set into motion. The existence of these waves is a consequence of the compressibility of liquids. A mathematical description of the waves may be obtained by using Tait's modified equation of state which is stated as:

$$P = B[(\rho/\rho_0)^n - 1] \tag{1}$$

Here, P denotes the pressure, B is a constant, $\rho$ the density, and $\rho_0$ a reference density. For an incompressible fluid one would have $n = \infty$, whereas experiment shows that for actual liquids $n$ is of the order of 6. The constant B for actual liquids is of the order of 3000 atm. (45,000 p.s.i.). As long as the pressure P remains small compared to B, the equation of state may be linearized. In view of the large value of B, we may safely assume this to be the case in fuel lines. The linearization leads to linear compression and linear expansion waves. The equation of state (1) becomes in this approximation $$P = nB(\rho - \rho_0)/\rho_0 \tag{2}$$

It is convenient to derive the formulas describing the linear waves by considering a flowing liquid, which passes through a stationary compression wave (FIGURE 7 ($g$)). Since mass is conserved while the fluid passes through the wave, we have $$\rho_1 V_1 = \rho_2 V_2 \tag{3}$$

Also, momentum must be conserved:

$$p_1 + \rho_1 V_1^2 = P_2 + \rho_2 V_2^2 \tag{4}$$

while (2) gives $$(P_2 - P_1)/nB = (\rho_2 - \rho_1)/\rho_1 \tag{5}$$

Equations 3–5 can be solved to give $$P_2 - P_1 = (nB\rho_1)^{\frac{1}{2}}(V_1 - V_2) \tag{6}$$

This equation may be rewritten with the aid of the sound speed "$a$," which is defined by $a^2 = dP/d\rho$. Using (5) gives $$a^2 = nb/\rho_0 \tag{7}$$

It can be seen that the density is almost constant throughout the wave, i.e., that $$\rho_1 \approx \rho_2 \approx \rho_0, \text{ while } \rho_2 - \rho_1 \ll \rho_0$$

and also that $$V_1 \approx V_2 \approx a, \text{ while } V_1 - V_2 \ll a$$

This makes it possible to rewrite (6) as $$P_2 - P_1 = \rho_0 a(V_1 - V_2), \text{ or} \tag{8a}$$

$$\Delta P = \rho_0 a \Delta V \tag{8b}$$

Identical results hold for the stationary expansion wave (FIGURE 7($a$)), which is obtained from the stationary compression wave by reversing the velocities. Equation 8 also describes all travelling waves in fuel lines. These travelling waves are obtained from the stationary waves simply by using a different frame of reference. For gasoline, "$a$" is about 1400 m./sec. and $\rho_0$ is about 700 kg./m.$^3$, which gives $$\Delta P \approx 10(\Delta V \text{ in m./sec.}) \text{ atm.} \tag{9}$$

Equation 8 or 9 indicates that whenever a wave travels through a liquid, the change in pressure is directly related to the change in fluid velocity. For a compression wave, the pressure behind the wave by definition is larger than in front of the wave, while for an expansion wave it is the other way around.

Considering now the present invention in light of the foregoing, an expansion wave is produced whenever the valve of a transducer 10 of FIGURE 1 and as taught by U.S. 3,412,718 is suddenly opened by means of the energizing pulse A shown in FIGURES 4 and 5, while a compression wave is produced whenever the transducer valve of transducer 10 is suddenly closed. FIGURES 7(a)–7(m) disclose diagrammatic illustrations of the wave phenomenon existing in a precision fuel metering system such as disclosed in FIGURES 1 and 4 with the effect produced by the wave inverters 28 and 30 shown in FIGURES 2 and 3. For purposes of illustration, the wavelength of the waves has been shown as being very small.

Considering FIGURE 7(b), the diagram illustrates the generation of an expansion wave on opening of a transducer 10. At the time the valve is opened, there is zero velocity in the line containing the fuel since no fuel is flowing. However, a pressure drop $P_1$ suddenly occurs and an expansion wave E having a pressure $P_2$ in front of the wave greater than $P_1$ develops which travels away from the valve at a velocity of "$a$." FIGURE 7(b) indicates that the expansion wave E progresses at a velocity "$a$" into fuel at rest where $V=o$ leaving behind it a fuel moving at $\Delta V$ toward the valve opening. This accounts for the continued flow of the fuel from the transducer valve. The expansion wave E continues to progress in the direction noted. As indicated above the wavelength of this wave is substantially longer than the diameter of the fuel line and as a result acts as a gradual pressure drop at the junction of the transducer to the fuel line or fuel rail.

Assume for sake of illustration that the fuel line 72 including a fuel rail such as the rail 12 or 14 shown in FIGURE 1 is dead-ended at the termination opposite from the fuel pump 22 and the wave E is incident thereto. This condition is shown with reference to FIGURE 7(c). The wave E is reflected, however, as the expansion wave E' as shown in FIGURE 7(d) and progresses back into the line where the fluid has a velocity of $\Delta V$ in the direction noted. The pressure $P_2'$ behind the wave is still less than the pressure in front of the wave $P_1'$ and equals $P_2 - 2\Delta P$ as shown in FIGURE 7(c). The effect of the dead-ending of the rail or fuel line merely produces a reflection of the incident expansion wave as an expansion wave with a reinforcement of the pressure effect.

FIGURES 7(e) and 7(f), on the other hand, illustrate the effect produced by means of a wave inverter such as shown with respect to the wave inverter 28 in FIGURE 1 being placed at the end of the fuel rails 12 and 14. In the situation described with respect to the expansion wave E flowing in the fuel rail such as shown with respect to FIGURE 7(b) wherein the pressure behind the wave is less than the pressure in front of the wave, it progresses with a velocity toward the diaphragm 48 as shown in FIGURE 2 encapsulating a specified volume of gas 50 which may be for example air. Upon arrival of the expansion wave E at the diaphragm 48, it sees a new boundary condition of a compressible medium of the gas 50 which, effectively, is a medium of constant pressure. This condition exists as long as the volume of the gas is sufficiently large compared with the volume rate of flow of the gasoline multiplied by the typical time between pulses, i.e., $T_T$ as shown in FIGURE 5. This condition of an elastic medium of constant pressure produces an inversion of the expansion wave E as a compression wave C as shown in FIGURE 7(f). The effect of the diaphragm 48 as a result of the pressure differential moves at a velocity to $2\Delta V$ in the direction of the reflected wave propagation. From this, it can be seen that the pressure $P_2'$ is greater than $P_1'$ which is the characteristic of a compression wave. FIGURES 7(b)–7(f) then illustrate the generation and travel of an expansion wave and the effect produced without a wave inverter as well as the effect of transforming an expansion wave into a compression wave by means of a wave inverter as shown in FIGURES 1–3.

Considering now a compression wave, attention is directed to FIGURES 7(g)–7(m). FIGURE 7(h) illustrates that upon closing of the transducer valve the fluid is still moving toward the valve at a velocity $\Delta V$ and the closure of the valve causes a buildup of the pressure $P_1$ such that $P_1$ is greater than $P_2$ which is characteristic of the compression wave as noted earlier. As the compression wave C arrives at the junction of the transducer 10 at a fuel line 72 or a fuel rail 12, a gradual pressure rise occurs due again to the relatively long wavelength of the wave in relation to the diameter of the fuel line. This compression wave C will propagate in both directions along the fuel line or fuel rail and if the fuel rail is dead-ended, the compression wave C will arrive and be reflected from the end of the rail as illustrated in FIGURE 7(j) and 7(k). However, upon reflection, the wave C' causes a doubling of the pressure rise so that the pressure $P_2'$ is equal to $P_2 + 2\Delta P$. By providing a wave inverter at the end of the fuel rail, the compression wave C as shown in FIGURE 7(l) progresses toward the diaphragm 48 and the volume of gas 50 in the same manner as described with respect to FIGURES 7(e) and 7(f); however, the situation is changed in that the compression wave C is reflected by the compressibility of the gas medium 50 as an expansion wave E as shown in FIGURE 7(m).

Thus by providing at the end of the fuel rail a volume of compressible gas, such as air, which is large in comparison to the volume of fuel injected per engine cycle, the proper boundary condition exists for converting one type of wave into its opposite counterpart. The diaphragm merely encapsulates the volume of air; however, it must have a small inertia so as to freely move and present little or no resistance to the movement of the wave in and out of the volume of air. The wave inverter can never be precisely positioned at the end of the fuel rail, or at all junctions where the transducers are coupled to the fuel line. However, it should be located within a multiple or a sub-multiple of the wavelength away from these positions.

In summation, the present invention is directed to a means for cancelling travelling waves of both the expansion and compression types which result from the operating characteristics of the transducers and more particularly from the fast-acting valves incorporated therein. These waves have a relatively short wavelength in comparison to the length of the fuel distribution means comprising the fuel line and/or fuel rails. The waves propagate freely and unless suppressed will build up into a standing wave mode pattern which results in a peak or valley at the position of the various transducers, thereby causing in some cases fuel starvation for one or more cylinders. By providing a wave inverter at least at the end of the fuel rail away from the fuel pump and pressure regulator side of the system, the expansion and compression waves are inverted, causing cancellation of the pressure effect. While accumulators are known to act as shock absorbers, it has been found that they will not solely eliminate the present problem due to the nature of the waves described; however, wave inverters will.

While the present invention has been disclosed with respect to preferred embodiments, it is not intended that it be limited to the specific details shown and described, but it is to be understood that all equivalents, alterations and modifications coming within the spirit and scope of the invention are herein meant to be included.

I claim as my invention:
1. In a discontinuous precision fuel metering system for internal combustion engines wherein increments of fuel are periodically delivered to each of the cylinders, the combination comprising:
   a source of fuel supplied under pressure;
   fuel distribution means coupled to said source of fuel and having one or more fuel metering transducers coupled thereto for delivering a measured amount of fuel to a respective cylinder when energized;
   means coupled to the source terminal end of said fuel distribution means for maintaining substantially constant pressure; and
   fluid pressure wave inverter means coupled to the op- posite terminal end of said fuel distribution means, said wave inverter means including a housing and a flexible diaphragm having a relatively small mass secured internally of said housing and defining a first and a second adjacent chamber thereby and encapsulating a volume of a predetermined gas in said first chamber which volume is sufficiently large compared to the volume of the measured amounts of fuel delivered by said one or more transducers to all of the respective cylinders when energized per engine cycle to provide a boundary condition at said opposite terminal end of an elastic medium having a constant pressure and an arbitrary fluid velocity, said housing additionally including input and output means, said input means being coupled to said fuel distribution means for allowing fuel to flow into said second chamber so that expansion and compression waves propagating in said fuel distribution means due to the operation of said one or more transducers are coupled into said first chamber and reflected therefrom as respective opposite waves.

2. The invention as defined by claim 1, and additionally including a second fluid pressure wave inverter coupled to said source terminal end of said fuel distribution means, said second fluid pressure wave inverter being substantially the same as said fluid pressure wave inverter means coupled to said opposite terminal end and said input means being coupled to said source of fuel, and said output means being coupled to said fuel distribution means.

3. The invention as defined by claim 1, wherein said flexible diaphragm is comprised of a synthetic resin.

4. The invention as defined by claim 3, wherein said synthetic resin comprises polyethylene terephalate.

5. The invention as defined by claim 1, wherein said flexible diaphragm of said first and second fluid wave inverters comprises a concavo-convex member.

6. The invention as defined by claim 5, wherein said concavo-convex flexible diaphragm includes a convex surface disposed toward the fuel in said second chamber.

7. In a precision fuel metering system for internal combustion engines wherein discontinuous increments of fuel are delivered periodically to the cylinders, the combination comprising:
a source of fuel supplied under pressure;
a fuel line having a predetermined cross sectional dimension and length coupled to said source of fuel;
one or more fuel metering transducers coupled to said fuel line for delivering a predetermined amount of fuel to a respective cylinder when energized, and generating a compression and expansion pressure travelling wave having a wavelength substantially smaller than the predetermined length of the fuel line when de-energized and energized, respectively;
means coupled to said source end of said fuel rail for maintaining the average pressure in said fuel rail at a substantially constant value; and
expansion and compression wave inverter means coupled to the opposite end of said fuel line for inverting incident waves such that compression waves are reflected as expansion waves and expansion waves are reflected as compression waves for preventing the build-up of standing wave modes contained in the fuel line as the result of the actuation of said transducers.

8. The invention as defined by claim 7, and additionally including compression and expansion wave inverter means coupled to the source end of said fuel line.

9. The invention as defined by claim 7, wherein said compression and expansion wave inverter is located a predetermined distance away from said opposite end of the fuel line, said predetermined distance being substantially equal to a multiple or submultiple of a wavelength of the travelling wave produced by the actuation of said transducers.

10. The invention as defined by claim 7, wherein said compression and expansion wave inverter means is located a predetermined distance away from a selected junction of said one or more transducers to the fuel line, said predetermined distance being substantially equal to a multiple or submultiple of a wavelength of the travelling wave produced by the actuation of said transducers.

11. The invention as defined by claim 7, wherein said compression and expansion wave inverter includes an encapsulated volume of gas and a flexible diaphragm in line with the fuel flow in said fuel rail said flexible diaphragm separating the fuel from the volume of gas, and said volume of gas being substantially greater than the total amount of fuel delivered to the cylinders each engine cycle.

12. The invention as defined by claim 11 wherein said volume of gas comprises air.

References Cited

UNITED STATES PATENTS

| | | | |
|---|---|---|---|
| 2,852,014 | 9/1958 | Paschke et al. | 123—139 |
| 2,874,640 | 2/1959 | Vickers | 123—139 XR |
| 3,026,928 | 3/1962 | Phillips et al. | |

LAURENCE M. GOODRIDGE, Primary Examiner

U.S. Cl. X.R.

123—32, 119